(12) United States Patent
Glatt

(10) Patent No.: US 7,071,964 B1
(45) Date of Patent: Jul. 4, 2006

(54) 360-DEGREE PANORAMIC SCENE-STORAGE DEVICE

(76) Inventor: Otto Gregory Glatt, 4 Crown Point, Ballston Lake, NY (US) 12019

(*) Notice: Subject to any disclaimer, the term of this patent is extended or adjusted under 35 U.S.C. 154(b) by 35 days.

(21) Appl. No.: 10/923,765

(22) Filed: Aug. 23, 2004

(51) Int. Cl.
*H04N 7/00* (2006.01)

(52) U.S. Cl. .......................... 348/36; 348/373

(58) Field of Classification Search ................ 348/36
See application file for complete search history.

(56) References Cited

U.S. PATENT DOCUMENTS

| | | | |
|---|---|---|---|
| 3,229,576 A | 1/1966 | Rees | |
| 3,240,113 A | 3/1966 | Stechemesser et al. | |
| 3,580,148 A | 5/1971 | Harvey | |
| 5,353,080 A | 10/1994 | Christman | |
| 5,563,650 A | 10/1996 | Poelstra | |
| 5,790,181 A | 8/1998 | Chahl et al. | |
| 6,226,035 B1* | 5/2001 | Korein et al. | 348/335 |
| 6,313,865 B1* | 11/2001 | Driscoll et al. | 348/36 |
| 6,333,759 B1 | 12/2001 | Mazzilli | |
| 6,690,268 B1 | 2/2004 | Schofield et al. | |
| 6,717,610 B1 | 4/2004 | Bos et al. | |
| 6,738,569 B1* | 5/2004 | Sogabe et al. | 396/21 |
| 2001/0010555 A1 | 8/2001 | Driscoll | |
| 2002/0109773 A1* | 8/2002 | Kuriyama et al. | 348/36 |
| 2005/0018074 A1* | 1/2005 | Nakamoto et al. | 348/375 |

* cited by examiner

*Primary Examiner*—David Ometz
*Assistant Examiner*—Anthony Daniels
(74) *Attorney, Agent, or Firm*—Michael R. Kahn

(57) ABSTRACT

A panoramic scene storage device comprises a convex reflector mounted within a housing. The housing has photochromic properties, such that it darkens when exposed to ultraviolet light. A capture device, preferably a CCD camera, is used to capture the 360 degree images from the convex reflector. The photochromic housing improves the performance of the capture system, especially in situations when bright sunlight is present in the captured scene.

5 Claims, 4 Drawing Sheets

360-DEGREE PANORAMIC SCENE-STORAGE DEVICE

FIELD OF THE INVENTION

The present invention relates generally to devices for recording images. More specifically, it relates to a device that captures and stores panoramic images.

BACKGROUND OF THE INVENTION

Various surveillance systems exist for recording and storing images in a designated area. These systems may often include multiple cameras. In some cases, it is desirable to use the minimum number of cameras to provide complete, 360-degree coverage of an area. For example, in the case of a motor vehicle where space may be limited, it is desirable to minimize the space taken up by the surveillance apparatus. The case of outdoor surveillance poses even more challenges. For example, sunlight, depending on the angle of the sun, can create extreme variations in the brightness of a given scene. Furthermore, an outdoor surveillance system has exposure to rain, snow, dust, and other environmental conditions. It is therefore desirable to provide an apparatus well suited to provide 360-degree coverage of outdoor areas, such as building premises, parking lots or parks. It is also desirable for the apparatus to be adaptable for use in a motor vehicle.

SUMMARY OF THE INVENTION

It is an objective of the present invention to provide a 360-Degree panoramic viewing and scene storage device suitable for use outdoors. The outdoor use poses multiple challenges, including, exposure control of direct sunlight, and keeping outdoor components of the device clean from environmental conditions such as dirt, ice, and snow. It is an objective of the present invention to provide a means of exposure control suitable for handling the lighting conditions encountered in outdoor use. It is yet another objective of the present invention to provide a means for cleaning the exterior of the device, to remove dirt and moisture for optimal viewing conditions. It is still a further objective of the present invention to provide a device suitable for use with a motor vehicle, as to monitor the immediate surroundings of the motor vehicle. This feature allows the device to serve as a vehicle incident recorder, covering a 360-degree area surrounding the vehicle. Since a collision may occur from any angle, it is important to provide 360-degree coverage. Furthermore, it is desirable to minimize the cost and size of the device.

DESCRIPTION OF PREFERRED EMBODIMENTS

Figure 1:
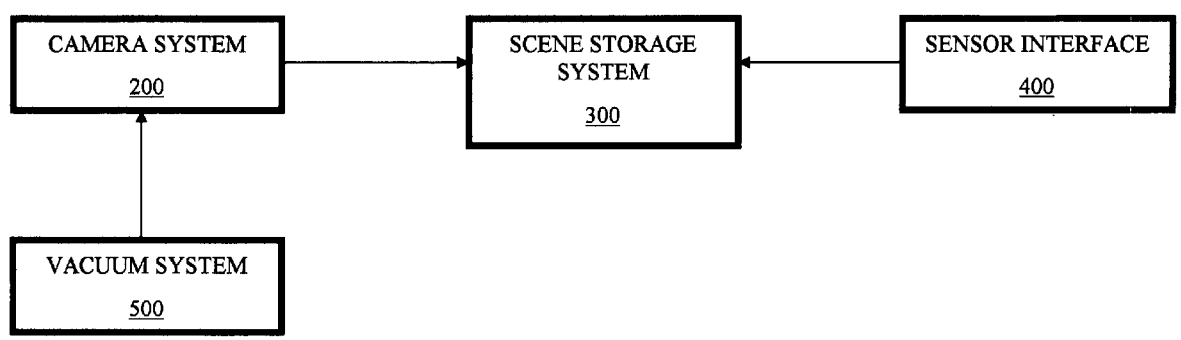
FIG. 1 shows a block diagram of an embodiment of the present invention.

A block diagram of a preferred embodiment of the present invention is shown in FIG. 1. The camera system 200 includes means for 360-degree panoramic scene capture, as well as a means for cleaning components of the optical system which are exposed to the exterior environment. The scene storage system 300 records a plurality of scenes captured by camera system 200. It is to be noted that the present invention may record full motion video (for example, 30 frames per second), or a series of still frames (for example, a frame every two seconds), depending on the application. The scene storage system preferably has a microprocessor, which controls the operation of a digital, re-recordable medium, such as Random Access memory (RAM), Recordable DVD, or a Hard Disk Drive (HDD). However, it is possible to use any suitable recording means with sufficient capacity to store a reasonable number of scenes, as determined by the application. The sensor interface 400 provides input to the scene storage device 300 to control operation in response to events. The sensor interface may receive inputs from a variety of sensors, including motion sensors and impact sensors. This can cause the microprocessor within the scene storage system 300 to start or stop recording in response to events. Vacuum system 500 preferably comprises an electrically operated vacuum pump. The pump generates vacuum or pressure in the interior of the camera system 200.

The pressure serves to move the camera system 200 to its extended position, which is used when the system is operational. The vacuum serves to move the camera system 200 into its retracted position. The retracted position provides protection for the camera system 200 when the device is not in use. Moving the camera system 200 to the retracted position also serves to clean its exterior. This helps to maximize the quality of the images captured with the camera system 200. The vacuum system 500 may be under manual control of a user. Alternatively, the vacuum system 500 may be controlled by an automatic means, such as a timer (not shown) that periodically activates the vacuum system 500 to extend or retract the camera system 200.

Figure 2:
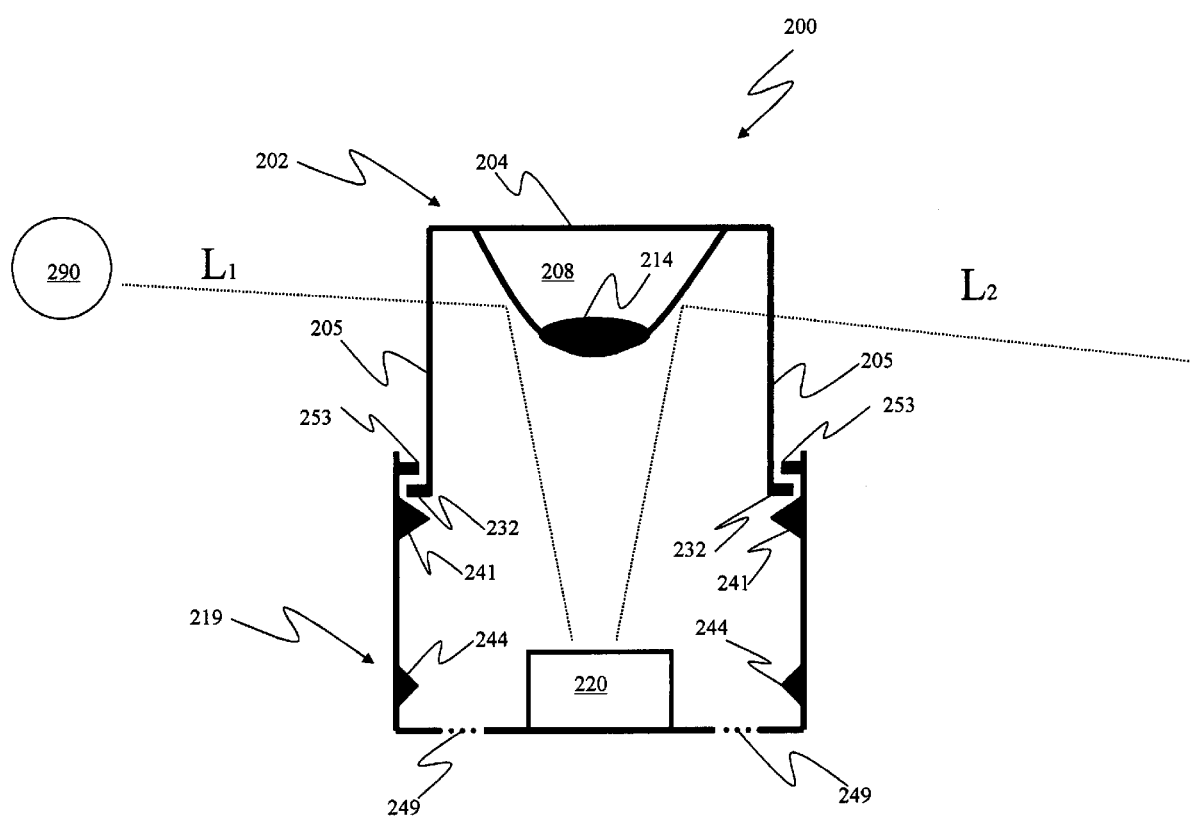
FIG. 2 shows a preferred embodiment of the optics of a panoramic camera of the present invention in an extended position.

FIG. 2 shows the camera system 200. Camera system 200 is contained within a housing comprising a movable housing subassembly 202, and a stationary housing subassembly 219. Convex reflector 208 is attached to the top of the movable housing subassembly 202. The movable housing subassembly 202 is cylindrical, and comprised of top 204, and cylinder wall 205. The top is preferably an opaque material. The cylinder wall 205 is made of a transparent material such as glass or plastic, and has a thin layer of photochromic material, preferably on the interior side of cylinder wall 205. Alternatively, the housing may be composed of multiple layers, with the photochromic material comprising an intermediate layer of the housing. The photochromic material has the optical property of darkening as the intensity of incident light exposed to the material increases. Photochromic materials are well known in the art. For example, photochromic materials are sold under the PHOTOSOL brand from PPG Industries, Inc. 1 PPG Place, Pittsburgh, Pa. USA. Another company providing photochromic materials is Exxene Corporation, of Corpus Christi, Tex. USA. These materials reversibly alter their color upon exposure to ultraviolet sources. When sunlight or ultraviolet radiation is applied, the molecular structure of the material changes, allowing a darkening effect to appear. At the base of cylinder wall 205 is a support lip 232 that circumscribes the movable housing subassembly 202. The support lip 232 is used to hold the movable housing subassembly 202 in a desired position.

Camera 220 is secured at the bottom of stationary housing assembly 219. The stationary housing subassembly 219 is also cylindrical. The camera 220 preferably converts the image to an electronic form using a Charge Coupled Display (CCD) or other equivalent technology. The stationary housing subassembly 219 has a lower ridge 244, upper ridge 241, and stop ridge 253. These ridges circumscribe the interior of the cylindrical stationary housing subassembly 219. The stationary housing subassembly 219 has one or more air holes 249 in its base to receive air conduits from vacuum system 500. As discussed with FIG. 1, the vacuum system 500 provides a pressure differential in the form of pressurization or vacuum within camera system 200. This pressure differential serves to retract or extend the movable housing subassembly 202. The upper ridge 241 is composed of a pliable material such as rubber. When pressure is applied, the movable housing subassembly 202 raises past upper ridge 241 of the stationary housing assembly 219. Stop ridge 253 is preferably made of a rigid material, and establishes a limit of travel for the moveable housing subassembly 202.

Figure 3:
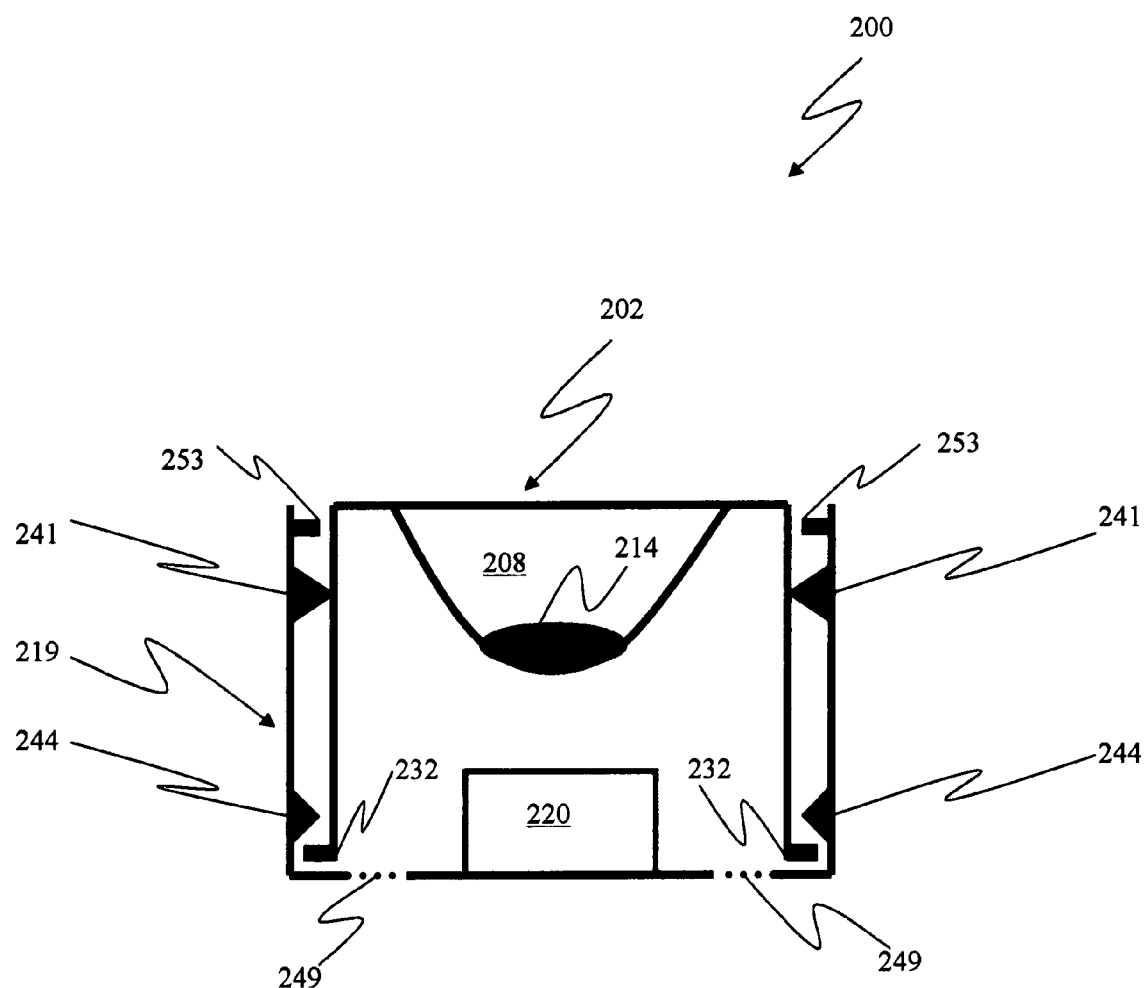
FIG. 3 shows a preferred embodiment of the optics of a panoramic camera of the present invention in a retracted position.

FIG. 3 shows a preferred embodiment of the optics of a panoramic camera of the present invention in a retracted position. To move the moveable housing subassembly 202 from an extended position (as shown in FIG. 2) to the retracted position shown in FIG. 3, a vacuum is applied to the camera system 200. The downward force on the moveable housing subassembly 202 overcomes the supporting force of upper ridge 241, the moveable housing subassembly 202 is then further moved beyond lower ridge 244 to be secured in a retracted position. Upper ridge 241 serves a dual purpose. In addition to providing support when the moveable housing subassembly 202 is in the extended position, it also serves to clean the moveable housing subassembly 202 as it is lowered and raised. The upper ridge 241 is preferably made of a rubber material that serves as a squeegee to remove moisture such as condensation or snow that could potentially collect on the exterior of moveable housing subassembly 202.

Figure 4:
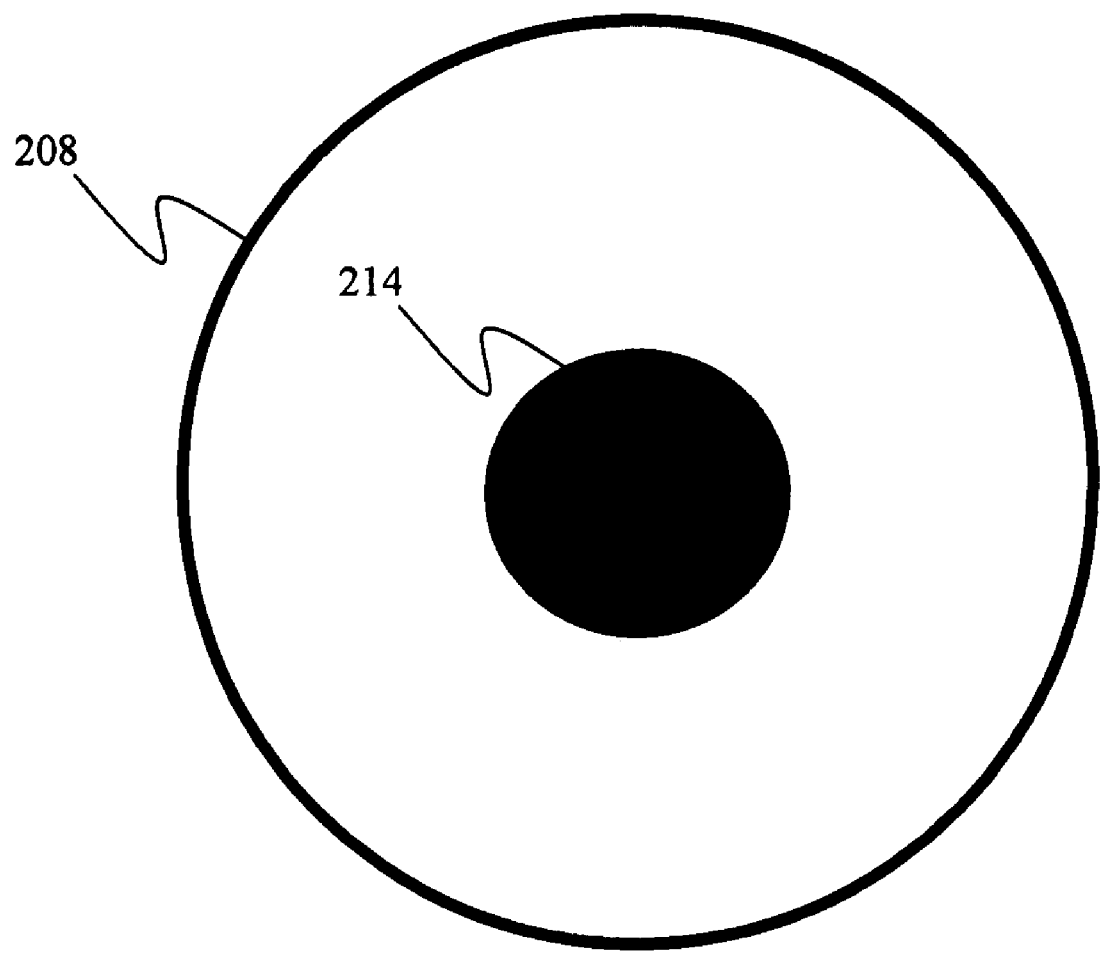
FIG. 4 shows detail of a preferred embodiment of a convex reflector of the present invention.

FIG. 4 shows a convex reflector as seen from camera 220 in FIG. 2. The convex reflector 208 has a non-reflective area in the center to prevent the reflected image of the camera from appearing in the captured images. The non-reflective area is preferably black.

OPERATION

A major difficulty with using a convex reflector-type panoramic camera in an outdoor application is the wide fluctuation in light intensity that may be encountered in a single image. For example, if the sun 290 is low in the sky as shown in FIG. 2, then the light rays indicated as $L_1$ will be substantially more intense than those rays indicated by $L_2$ on the opposite side of the housing 202. This can cause exposure problems for single-CCD based cameras, as CCD arrays have difficulty in handling the extreme differences in light intensity that are produced in an optical system using a convex mirror. In the case of the present invention, as illustrated in FIG. 2, the cylindrical wall 205 of housing 202 will darken more where the housing is exposed to bright sunlight from sun 290. Incident light from the opposite side of the housing, indicated by $L_2$ being of lower intensity, will not cause the housing to darken appreciably on that side, allowing more of the light from rays $L_2$ to pass through the housing, and into the camera. The photochromic material serves to reduce the variation in light intensity, thereby allowing a convex reflector system to be used outdoors in daylight more effectively. Since the device employs one single-CCD camera, the cost is significantly lower than a multiple camera arrangement. Furthermore, the retractable, self-cleaning aspects of the present invention make it suitable for use in a motor vehicle. For example, the camera system 200 could be mounted on the roof of a police vehicle to capture the area surrounding the vehicle.

Although the description above contains many specific details, these should not be construed as limiting the scope of the invention, but merely as providing illustrations of some of the presently preferred embodiments of the present invention. Thus the scope of the invention should be determined by the appended claims and their legal equivalents, rather than by the examples given.

What is claimed is:

1. A panoramic scene storage device comprising a convex reflector, and image capturing means, wherein the convex reflector and image capturing means are circumscribed by a generally cylindrical housing, said housing comprised of a movable housing subassembly, and a stationary housing subassembly, and further comprising extending means for extending said movable housing subassembly from a retracted position to an extended position, said movable housing subassembly composed of a photochromic material, whereby the housing darkens when exposed to ultraviolet light.

2. The panoramic scene storage device of claim 1, further comprising at least one ridge circumscribing the interior of the stationary housing subassembly, whereby said ridge makes contact with the movable housing subassembly serving to clean said movable housing subassembly as it is moved past said ridge.

3. The panoramic scene storage device of claim 1, further comprising one or more air holes in the base of the stationary housing subassembly, whereby at least one air hole is connected to an air conduit from a vacuum system, said vacuum system providing the extending means for moving the movable housing subassembly.

4. The panoramic scene storage device of claim 3, comprising, a stop ridge circumscribing the interior of the stationary housing subassembly, an upper ridge circumscribing the interior of the stationary housing subassembly, and a support lip circumscribing the movable housing subassembly at its base, whereby the support lip travels beyond the upper ridge, and contacts the stop ridge to limit travel in the direction of the extended position as to bound the support lip between the upper ridge and the stop ridge.

5. The panoramic scene storage device of claim 4, further comprising, a lower ridge circumscribing the interior of the stationary housing subassembly, whereby the support lip travels beyond the lower ridge, and contacts the base of the stationary housing subassembly as to limit the travel in the direction of the retracted position as to bound the support lip between the lower ridge and the base of the stationary housing subassembly.

* * * * *